US009682637B2

United States Patent
Shimizu et al.

(10) Patent No.: US 9,682,637 B2
(45) Date of Patent: Jun. 20, 2017

(54) CHARGING MANAGEMENT BASED ON DEMAND RESPONSE EVENTS

(71) Applicant: TOYOTA JIDOSHA KABUSHIKI KAISHA, Toyota-shi, Aichi-ken (JP)

(72) Inventors: Takayuki Shimizu, Mountain View, CA (US); Akihisa Yokoyama, Mountain View, CA (US); Atsushi Kawakubo, Toyota (JP)

( * ) Notice: Subject to any disclaimer, the term of this patent is extended or adjusted under 35 U.S.C. 154(b) by 383 days.

(21) Appl. No.: 14/245,760

(22) Filed: Apr. 4, 2014

(65) Prior Publication Data

US 2015/0283912 A1 Oct. 8, 2015

(51) Int. Cl.
*H02J 7/04* (2006.01)
*H02J 7/16* (2006.01)
*B60L 11/18* (2006.01)
*H02J 7/00* (2006.01)

(52) U.S. Cl.
CPC ....... *B60L 11/1862* (2013.01); *B60L 11/1809* (2013.01); *B60L 11/1846* (2013.01); *B60L 11/1848* (2013.01); *H02J 7/007* (2013.01); *Y02T 10/7005* (2013.01); *Y02T 10/7088* (2013.01); *Y02T 90/168* (2013.01); *Y04S 30/12* (2013.01)

(58) Field of Classification Search
CPC ............. B60L 11/1846; B60L 11/1848; B60L 11/1862; G01R 31/3606; H02J 7/007; Y02T 10/7005; Y02T 10/7088; Y02T 90/168; Y04S 30/12
See application file for complete search history.

(56) References Cited

U.S. PATENT DOCUMENTS

| 2011/0224852 | A1* | 9/2011 | Profitt-Brown | B60L 11/1824 701/22 |
| 2011/0270476 | A1* | 11/2011 | Doppler | B60L 11/1816 701/22 |
| 2013/0191321 | A1* | 7/2013 | Lovett | B60L 11/1838 706/58 |

OTHER PUBLICATIONS

Yifeng He, Bala Venkatesh, Ling Guan, "Optimal Scheduling for Charging and Discharging of Electric Vehicles," Smart Grid, IEEE Transactions on, Jul. 19, 2012, pp. 1095-1105, vol. 3, Issue 3, United States.

(Continued)

*Primary Examiner* — Nha Nguyen
(74) *Attorney, Agent, or Firm* — Burbage Law, P.C.; Jon-Michael Burbage; Elizabeth Ruzich

(57) ABSTRACT

The disclosure includes a system and method for providing charging services to mobile client devices. The system includes a processor and a memory storing instructions that, when executed, cause the system to: estimate a departure time for a mobile client device; determine a target state of charge at the departure time for a battery system in the mobile client device; determine one or more available charging periods and one or more demand response event periods; determine one or more amounts of power to be discharged from the battery system during the one or more demand response event periods; determine one or more charging time slots within the one or more available charging periods based on the target state of charge and the one or more amounts of power to be discharged; and charge the battery system using the one or more charging time slots.

24 Claims, 10 Drawing Sheets

(56) References Cited

OTHER PUBLICATIONS

A. Barbato, A. Capone, G. Carello, M. Delfanti, M. Merlo, A. Zaminga, "House Energy Demand Optimization in Single and Multi-User Scenarios," Smart Grid Communications, 2011 IEEE International Conference on, Oct. 17-20, 2011, pp. 345-350, Brussels, Belgium.

Kevin Mets, Tom Verschueren, Filip de Turck, Chris Develder, "Exploiting V2G to Optimize Residential Energy Consumption with Electrical Vehicle (dis)charging," Smart Grip Modeling and Simulation (SGMS), 2011 IEEE First International Workshop, Oct. 17, 2011, pp. 7-12, Brussels, Belgium.

Siddhartha Mal, Arunabh Chattopadhyay, Albert Yang, Rajit Gadh, "Electric Vehicle Smart Charging and Vehicle-to-Grid Operation," International Journal of Parallel, Emergent and Distributed Systems, pp. 249-265, vol. 28, Issue 3, 2013, Bristol, PA, USA.

\* cited by examiner

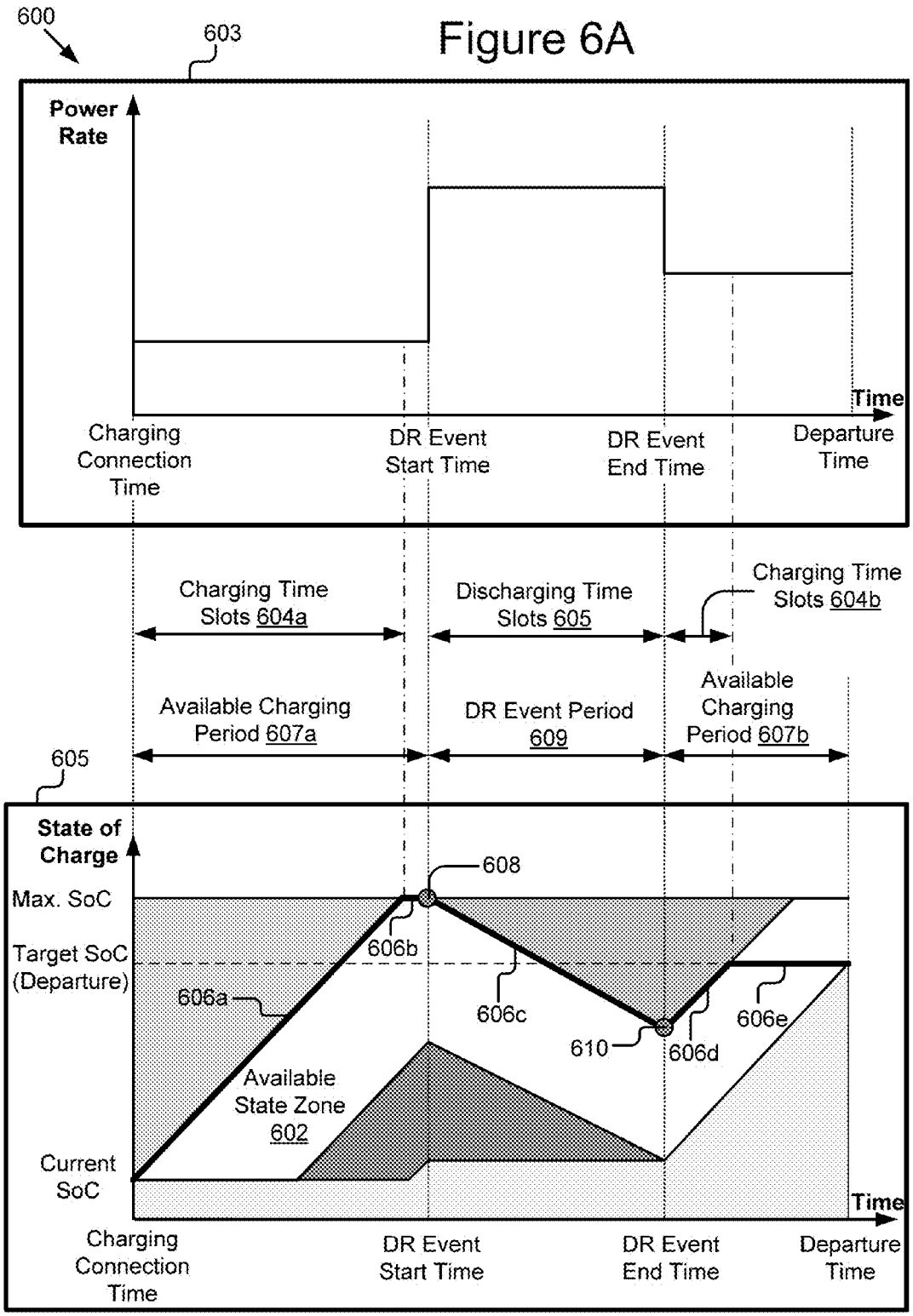

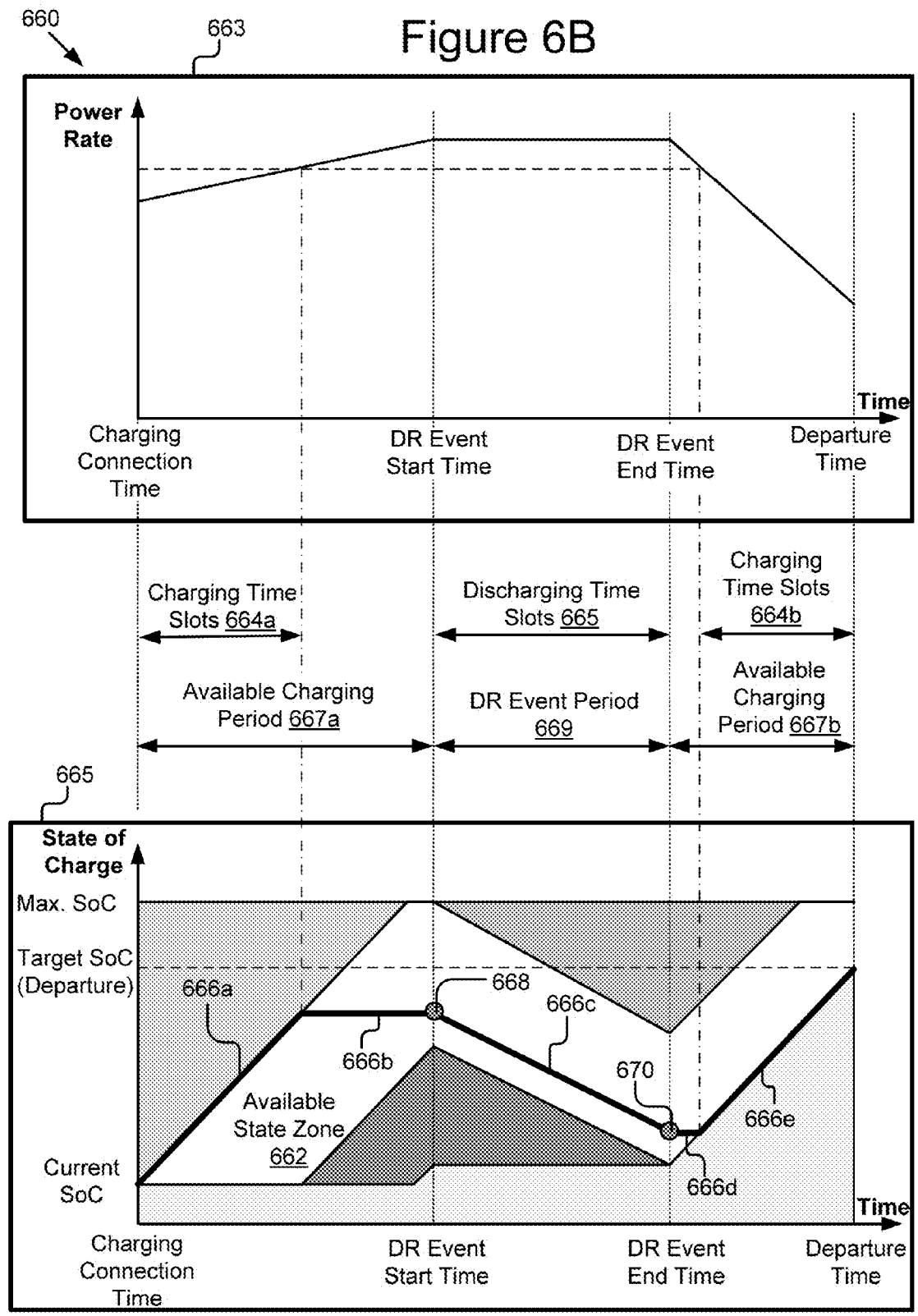

CHARGING MANAGEMENT BASED ON DEMAND RESPONSE EVENTS

BACKGROUND

The specification relates to providing charging services to mobile client devices. In particular, the specification relates to determining charging schedules and discharging schedules for mobile client devices based on demand response events.

A vehicle and a power system may form a two-way electric power supply system. For example, a home energy management system may supply electric power to a vehicle for charging a battery in the vehicle. The battery in the vehicle may then be discharged to return the electric power back to the home energy management system using vehicle-to-home (V2H) technologies. In another example, the battery in the vehicle may be charged using electric power from a power grid system and then discharged to return the electric power back to the power grid system using vehicle-to-grid (V2G) technologies. Thus, both a charging process and a discharging process may occur to the vehicle connected to the power system. However, existing technologies fail to consider both the charging process and the discharging process when providing charging services to the vehicle.

SUMMARY

According to one innovative aspect of the subject matter described in this disclosure, a system for providing charging services to mobile client devices includes a processor and a memory storing instructions that, when executed, cause the system to: estimate a departure time for a mobile client device associated with a user based on historical journey data associated with the user; determine a target state of charge at the departure time for a battery system in the mobile client device; determine one or more available charging periods and one or more demand response event periods based on demand response event data; determine one or more amounts of power to be discharged from the battery system during the one or more demand response event periods; determine one or more charging time slots within the one or more available charging periods based on the target state of charge at the departure time and the one or more amounts of power to be discharged during the one or more demand response event periods; and charge the battery system using the one or more charging time slots.

In general, another innovative aspect of the subject matter described in this disclosure may be embodied in methods that include: estimating a departure time for a mobile client device associated with a user based on historical journey data associated with the user; determining a target state of charge at the departure time for a battery system in the mobile client device; determining one or more available charging periods and one or more demand response event periods based on demand response event data; determining one or more amounts of power to be discharged from the battery system during the one or more demand response event periods; determining one or more charging time slots within the one or more available charging periods based on the target state of charge at the departure time and the one or more amounts of power to be discharged during the one or more demand response event periods; and charging the battery system using the one or more charging time slots.

Other aspects include corresponding methods, systems, apparatus, and computer program products for these and other innovative aspects.

These and other implementations may each optionally include one or more of the following operations and features. For instance, the features include: receiving power rate data; determining a current state of charge of the battery system; determining one or more event start times and one or more event end times associated with the one or more demand response event periods; determining an available state zone based on the current state of charge, the target state of charge, and the one or more amounts of power to be discharged during the one or more demand response event periods; determining a sequence of states satisfying the available state zone, the sequence of states including one or more start states of charge at the one or more event start times and one or more end states of charge at the one or more event end times for the battery system; determining the one or more charging time slots based on the power rate data, the current state of charge, the one or more start states of charge at the one or more event start times, the one or more end states of charge at the one or more event end times, and the target state of charge at the departure time; the sequence of states maximizing a total gain for the mobile client device; the total gain being equal to a discharging gain minus a charging cost; the discharging gain including a gain obtained from discharging the one or more amounts of power to a power system during the one or more demand response event periods; the charging cost including a power cost incurred by charging the battery system during the one or more available charging periods, wherein a state of charge of the battery system at the departure time satisfies the target state of charge; the available state zone including an upper bound and a lower bound; and the mobile client device including a vehicle.

For instance, the operations include: receiving power rate data; determining one or more discharging time slots in the one or more demand response event periods based on the power rate data and the one or more amounts of power to be discharged; and discharging the battery system using the one or more discharging time slots.

The disclosure is particularly advantageous in a number of respects. For example, the system can maximize monetary benefits for a user by charging a vehicle associated with the user during one or more available charging periods and discharging the vehicle during one or more demand response event periods. The monetary benefits include a total gain obtained from the charging-discharging process of the vehicle. In another example, charging vehicles during off-peak demand times and discharging power from the vehicles during peak demand times may facilitate the balance of power supply and demand in a regional power grid network. The advantages of the system described herein are provided by way of example, and the system may have numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

FIGS. 6A and 6B are graphic representations illustrating examples of charging schedules and discharging schedules that are determined based on power rate data and available state zones.

DETAILED DESCRIPTION

System Overview

Figure 1:
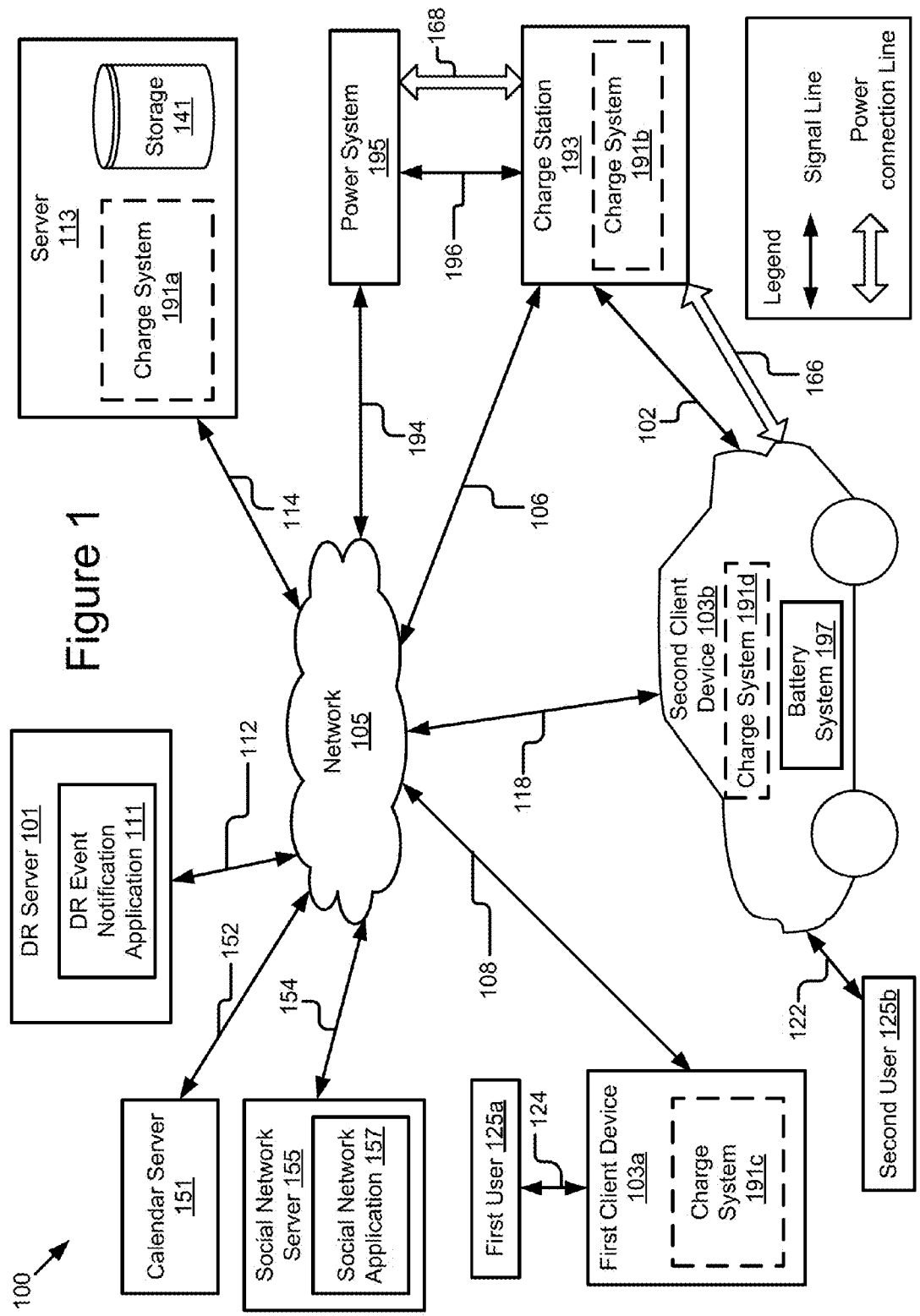
FIG. 1 is a block diagram illustrating an example system for providing charging services to mobile client devices.

FIG. 1 illustrates a block diagram of some implementations of a system 100 for providing charging services to mobile client devices. The system 100 includes a DR server 101, a server 113, a calendar server 151, a social network server 155, a charge station 193, a power system 195, a first client device 103a, and a second client device 103b (also referred to herein individually and collectively as client device 103). The first client device 103a and the second client device 103b can be accessed by users 125a and 125b (also referred to herein individually and collectively as user 125), respectively. In the illustrated implementation, these entities of the system 100 may be communicatively coupled via a network 105. The system 100 may include other servers or devices not shown in FIG. 1 including, for example, a traffic server for providing traffic data, a weather server for providing weather data, a power service server for providing power usage service (e.g., billing service), and a map server for providing map data, etc.

The client devices 103a, 103b in FIG. 1 can be used by way of example. While FIG. 1 illustrates two client devices 103a and 103b, the present disclosure applies to a system architecture having one or more client devices 103. Furthermore, although FIG. 1 illustrates one network 105 coupled to the client devices 103, the DR server 101, the server 113, the calendar server 151, the social network server 155, the charge station 193, and the power system 195, in practice one or more networks 105 can be connected to these entities. While FIG. 1 includes one DR server 101, one server 113, one calendar server 151, one social network server 155, one charge station 193, and one power system 195, the system 100 could include one or more DR servers 101, one or more servers 113, one or more calendar servers 151, one or more social network servers 155, one or more charge stations 193, and one or more power systems 195.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, WAP, e-mail, etc.

In some implementations, the charge system 191a can be operable on the server 113. The server 113 can be a hardware server that includes a processor, a memory, and network communication capabilities. In the illustrated implementation, the server 113 is coupled to the network 105 via signal line 114. The server 113 sends and receives data to and from other entities of the system 100 via the network 105. The server 113 includes a storage device 141 for storing data to provide the functionality described herein. The storage device 141 is described below in more detail.

In some implementations, the charge system 191b can be operable on the charge station 193. The charge station 193 may be an infrastructure element that supplies electric power for recharging a battery system 197 in the client device 103. For example, the charge station 193 may provide electric power for recharging battery systems in all-electric vehicles, neighborhood electric vehicles, or plug-in hybrid electric vehicles. In some implementations, the charge station 193 may be a household charge station in a garage. In some other implementations, the charge station 193 may be a public charge station on a street or a parking lot.

In some implementations, the charge station 193 is communicatively coupled to the network 105 via a signal line 106 for communicating with other entities of the system 100 including the power system 195 and the client devices 103. Alternatively or additionally, the charge station 193 may be directly coupled to the power system 195 via a signal line 196. The charge station 193 may be directly coupled to the second client device 103b via a signal line 102. In the illustrated implementation, the charge station 193 is also electrically coupled to the power system 195 via a power connection line 168. The power connection line 168 may represent a wired power supply channel such as an electricity line. The charge station 193 is electrically coupled to the second client device 103b via a power connection line 166. The power connection line 166 may represent a wired power supply channel or a wireless power supply channel.

In some implementations, the charge system 191c can be operable on the first client device 103a. The first client device 103a may be a computing device that includes a memory and a processor, for example, a laptop computer, a desktop computer, a tablet computer, a mobile telephone, a personal digital assistant ("PDA"), a mobile e-mail device, a portable game player, a portable music player, a television with one or more processors embedded therein or coupled thereto, or other electronic device capable of accessing the network 105. In some implementations, the charge system 191c may act in part as a thin-client application that may be stored on the first client device 103a and in part as components that may be stored on one or more of the server 113, the charge station 193, and the second client device 103b. In the illustrated implementation, the first client device 103a is communicatively coupled to the network 105 via a signal line 108. The user 125a interacts with the first client device 103a via a signal line 124.

In some implementations, the charge system 191d can be operable on the second client device 103b. The second client device 103b can be a mobile client device with the battery system 197. For example, the second client device 103b can be one of a vehicle (e.g., an automobile, a bus), a bionic implant, or any other mobile system including non-transitory computer electronics and a battery system. In some implementations, the second client device 103b may include a computing device that includes a memory and a processor. In the illustrated implementation, the second client device 103b is communicatively coupled to the network 105 via a signal line 118. The second user 125b may interact with the second client device 103b via a signal line 122.

In some implementations, the first user 125a and the second user 125b can be the same user 125 interacting with both the first client device 103a and the second client device 103b. For example, the user 125 can be a passenger or a driver sitting in the second client device 103b (e.g., a vehicle) and operating on the first client device 103*a* (e.g., a smartphone). In some other implementations, the first user 125*a* and the second user 125*b* may be different users 125 that interact with the first client device 103*a* and the second client device 103*b* respectively.

In some implementations, the second client device 103*b* may include one or more sensors (not shown), such as a navigation sensor (e.g., a global positioning system (GPS) sensor), an infrared detector, a motion detector, a thermostat, a sound detector, and any other type of sensors. For example, the second client device 103*b* may include sensors for measuring one or more of a current time, a location (e.g., a latitude, longitude, and altitude of a location), an acceleration of a vehicle, a velocity of a vehicle, a fuel tank level, and a battery level of a vehicle (e.g., a state of charge of the battery system 197), etc. The sensors may generate sensor data describing the measurements and send the sensor data to the charge system 191*d*.

The charge system 191 can be a system for providing charging services to mobile client devices. In some implementations, the charge system 191 can be implemented using hardware including a field-programmable gate array ("FPGA") or an application-specific integrated circuit ("ASIC"). In some other implementations, the charge system 191 can be implemented using a combination of hardware and software. The charge system 191 may be stored in a combination of the devices and servers, or in one of the devices or servers. The charge system 191 is described in more detail below with reference to FIGS. 2-4C.

The battery system 197 may include one or more batteries for supplying power to the second client device 103*b*. In some implementations, the battery system 197 may also include code and routines for determining a current state of charge for the one or more batteries in the battery system 197. A state of charge (SoC) may indicate a battery charge state in the battery system 197. For example, a state of charge for the battery system 197 indicates that the one or more batteries in the battery system 197 are 80% charged.

The power system 195 may be an electric power system, which is communicatively coupled to the network 105 via a signal line 194. In some implementations, the power system 195 includes a power grid system that supplies electric power to the charge station 193 for charging the battery system 197 in the second client device 103*b*. The power grid system, the charge station 193, and the second client device 103*b* (e.g., a vehicle) may form a two-way electric power supply system that includes a grid-to-vehicle system and a vehicle-to-grid (V2G) system. For example, the battery system 197 in the vehicle may be charged using power received from the power grid system during off-peak demand times. However, during peak demand times the battery system 197 may be discharged to deliver power back to the power grid system through the charge station 193.

In some implementations, the power system 195 includes a home energy management system (HEMS) that manages household power usage at a home. The home energy management system, the charge station 193, and the second client device 103*b* (e.g., a vehicle) may form a two-way electric power supply system that includes a home-to-vehicle system and a vehicle-to-home (V2H) system. The battery system 197 in the vehicle may be charged using power received from the home energy management system during off-peak demand times. Also, the battery system 197 may be discharged to deliver power back to the home energy management system during peak demand times so that the home energy management system may reduce or even eliminate the power usage from a regional power grid system. In times of emergency, the battery system 197 may be used as a power source to supply power through the charge station 193 to lights and power outlets at home.

The storage device 141 can be a non-transitory storage medium that stores data for providing the functionality described herein. The storage device 141 may be a dynamic random access memory (DRAM) device, a static random access memory (SRAM) device, flash memory, or some other memory devices. In some implementations, the storage device 141 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the storage device 141 stores time synchronicity data, historical journey data, user profile data, power rate data, and any other data for providing the functionality described herein. The historical journey data associated with a user may describe historical journeys taken by the user. For example, the historical journey data includes data describing one or more of a start point, an end point, time of departure from the start point, time of arrival at the end point, a route, a duration, a direction, and other journey context data associated with a journey taken by the user. The user profile data can be data describing user profiles. For example, the user profile data associated with a user includes a user name, an e-mail address, user preferences, hobbies, interests, education, work experience, and other demographic data describing the user. Other example user profile data is possible. The power rate data may describe power rates for power usage in different times. For example, the power rate data may describe a power rate chart indicating how the power rate is changed during different hours in a day.

The demand response (DR) server 101 can be a hardware server that includes a processor, a memory, and network communication capabilities. In the illustrated implementation, the DR server 101 is coupled to the network 105 via a signal line 112. The DR server 101 sends and receives data to and from one or more of the client devices 103, the server 113, the charge station 193, and the power system 195 via the network 105. For example, the DR server 101 sends DR events to the charge system 191 via the network 105.

DR may be described as the changes in electricity usage by end-use customers from their normal consumption patterns in response to changes in the price of electricity over time. DR may also relate to incentive payments designed to induce lower electricity use at times of high wholesale market prices or when the electricity grid is unreliable. DR includes all intentional modifications to consumption patterns of electricity of end-use customers that are intended to alter the timing, level of instantaneous demand, or the total electricity consumption.

In the illustrated implementation, the DR server 101 includes a DR event notification application 111. The DR event notification application 111 can include code and routines for generating and sending DR events to other entities of the system 100 including the charge system 191 and the power system 195. For example, the DR event notification application 111 sends DR event data describing one or more DR events to the charge system 191.

A DR event may be an event related to demand response in a power grid system. For example, a DR event may be an event indicating that: (1) the price for electricity is scheduled to increase during a certain time period; and (2) the client device 103 is requested to reduce its consumption of electricity under a specific usage amount. In some implementations, a DR event includes one or more DR requirements for regulating power usage. For example, a DR event indicates that the power usage between 6:00 PM and 11:00 PM at a user's home may not exceed a predetermined amount of electricity. In another example, a DR event may specify a DR event start time and a DR event end time, where a time period between the DR event start time and the DR event end time forms a DR event period. The DR event may specify that charging vehicles during the DR event period may not be allowed since, for example, power demand in the regional power grid network may exceed power supply during the DR event period.

The calendar server 151 can be a hardware server that includes a processor, a memory, and network communication capabilities. In the illustrated implementation, the calendar server 151 is coupled to the network 105 via a signal line 152. The calendar server 151 sends and receives data to and from other entities of the system 100 via the network 105. For example, the calendar server 151 sends data describing a user's calendar to the charge system 191 with permission from the user.

The social network server 155 can be a hardware server that includes a processor, a memory, and network communication capabilities. In the illustrated implementation, the social network server 155 is coupled to the network 105 via a signal line 154. The social network server 155 sends and receives data to and from other entities of the system 100 via the network 105. The social network server 155 includes a social network application 157. A social network can be a type of social structure where the users 125 may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related.

It is understood that the social network server 155 and the social network application 157 can be representative of one social network and that there may be multiple social networks coupled to the network 105, each having its own server, application, and social graph. For example, a first social network may be more directed to business networking, a second may be more directed to or centered on academics, a third may be more directed to local business, a fourth may be directed to dating, and others may be of general interest or a specific focus.

Example Charge System

Figure 2:
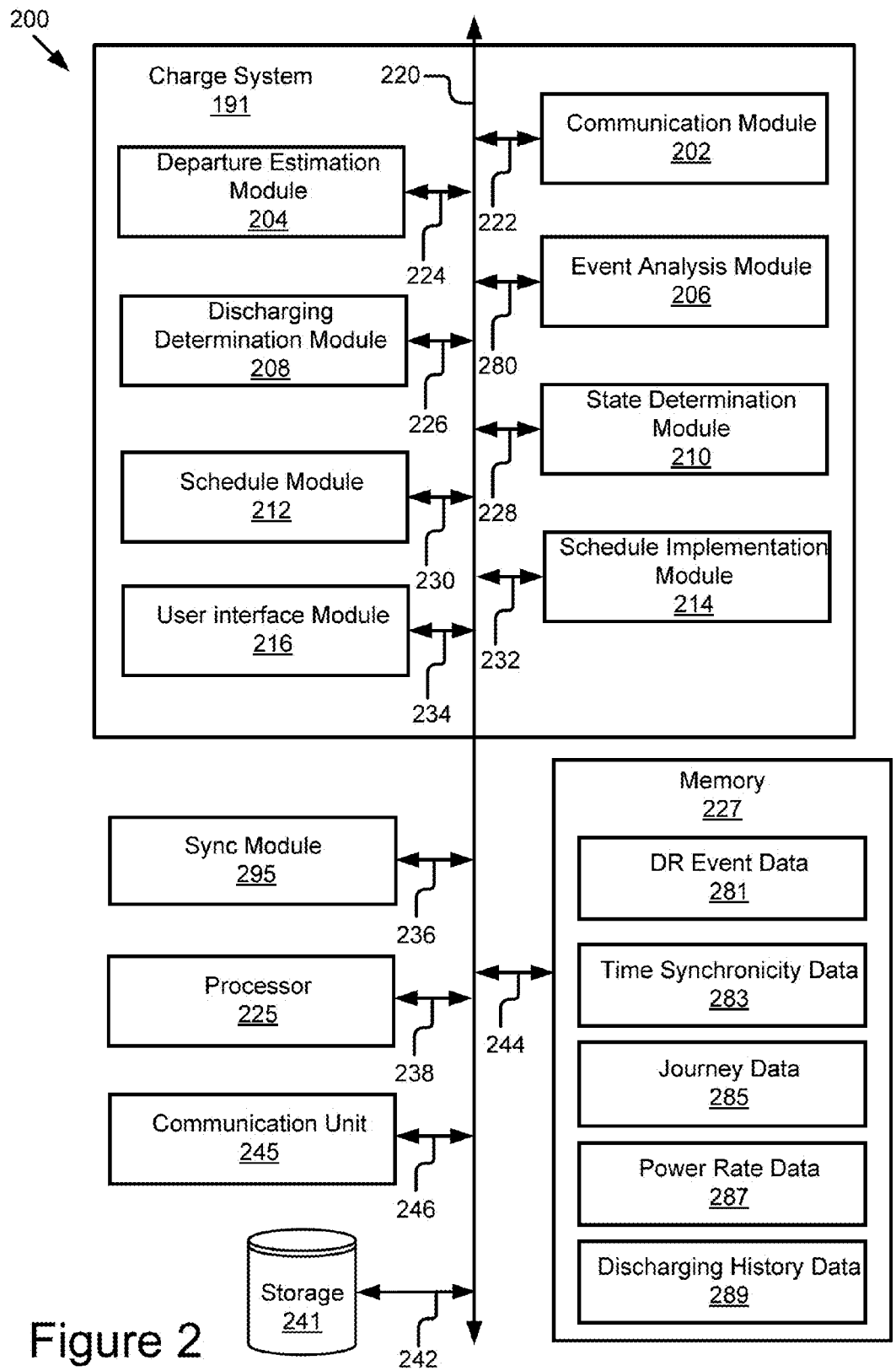
FIG. 2 is a block diagram illustrating an example computing device that includes an example charge system.

Referring now to FIG. 2, an example of the charge system 191 is shown in more detail. FIG. 2 is a block diagram of a computing device 200 that includes the charge system 191, a synchronization (sync) module 295, a processor 225, a communication unit 245, a storage device 241, and a memory 227 according to some examples. The components of the computing device 200 are communicatively coupled by a bus 220. In some implementations, the computing device 200 can be one of the server 113, the first client device 103a, the second client device 103b, the charge station 193, and another server or device that may include the charge system 191.

The processor 225 includes an arithmetic logic unit, a microprocessor, a general purpose controller, or some other processor array to perform computations and provide electronic display signals to a display device. The processor 225 is coupled to the bus 220 for communication with the other components via a signal line 238. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. Other processors, operating systems, sensors, displays, and physical configurations may be possible.

The memory 227 stores instructions or data that may be executed by the processor 225. The memory 227 is coupled to the bus 220 for communication with the other components via a signal line 244. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores DR event data 281, time synchronicity data 283, journey data 285, power rate data 287, and discharging history data 289. The DR event data 281 can be data describing one or more DR events. For example, the DR event data 281 may include an event start time and an event end time for each DR event. The journey data 285 may include data describing a user's historical journeys. The power rate data 287 may describe power rates during different times in a day.

The time synchronicity data 283 can be data used to synchronize a device time with a universal time. For example, the time synchronicity data 283 can be configured to synchronize a local time associated with a vehicle with a universal time. In some implementations, a local time may be synchronized with the Coordinated Universal Time (UTC) defined by International Telecommunications Union Recommendation (ITU-R TF.460-6) according to a corresponding local time zone. In some other implementations, a local time may be synchronized by timekeeping technologies including GPS satellites and a network time protocol (NTP). The network time protocol may include a networking protocol for clock synchronization between computer systems over packet-switched variable-latency data networks.

The discharging history data 289 may include data describing a discharging history associated with the battery system 197. In some implementations, the discharging history may describe one or more amounts of power discharged from the battery system 197 to the power system 195 during one or more past DR event periods. In some implementations, the discharging history may include one or more discharging rates at which power was discharged from the battery system 197 to the power system 195 during one or more past DR event periods. The one or more discharging rates may include rates between a minimal discharging rate and a maximal discharging rate. In some examples, the minimal discharging rate describes a slowest discharging speed at which power is discharged from the battery system 197. The maximal discharging rate describes a fastest discharging speed at which power is discharged from the battery system 197.

The communication unit 245 transmits and receives data to and from at least one of the client devices 103, the charge station 193, and the server 113 depending upon where the charge system 191 is stored. The communication unit 245 is coupled to the bus 220 via a signal line 246. In some implementations, the communication unit 245 includes a port for direct physical connection to the network 105 or to another communication channel. For example, the communication unit 245 includes a USB, SD, CAT-5, or similar port for wired communication with the client devices 103. In some implementations, the communication unit 245 includes a wireless transceiver for exchanging data with the client devices 103 or other communication channels using one or more wireless communication methods, including IEEE 802.11, IEEE 802.16, BLUETOOTH®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The storage device 241 can be a non-transitory storage medium that stores data for providing the functionality described herein. The storage device 241 may be a dynamic random access memory (DRAM) device, a static random access memory (SRAM) device, flash memory, or some other memory devices. In some implementations, the storage device 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage device 241 is communicatively coupled to the bus 220 via a signal line 242. In some implementations, the storage device 241 stores data similar to that stored in the storage device 141. The storage device 241 may also store data that was temporarily stored in the memory 227.

The sync module 295 can include code and routines for synchronizing data stored on the computing device 200 with data stored on other entities of the system 100. For example, the sync module 295 synchronizes the DR event data 281 stored in the memory 227 with corresponding DR event data stored in the DR server 101. In another example, the sync module 295 synchronizes the time synchronicity data 283, the journey data 285, the power rate data 287, and the discharging history data 289 stored in the memory 227 with corresponding cloud data stored in the storage device 141 of the server 113. In the illustrated implementation, the sync module 295 is communicatively coupled to the bus 220 via a signal line 236.

In the illustrated implementation shown in FIG. 2, the charge system 191 includes a communication module 202, a departure estimation module 204, an event analysis module 206, a discharging determination module 208, a state determination module 210, a schedule module 212, a schedule implementation module 214, and a user interface module 216. These components of the charge system 191 are communicatively coupled to each other via the bus 220.

In some implementations, components of the charge system 191 can be stored in a single server or device. In some other implementations, components of the charge system 191 can be distributed and stored across multiple servers or devices. For simplicity and convenience purpose, the various modules in FIG. 2 are described below with reference to a vehicle, which is an example of a mobile client device. However, the description is not intended to limit the scope of the disclosure, and it is understood that the description also applies to other examples of mobile client devices. Furthermore, it is understood that the separation of various components, modules, and servers in the implementations described herein should not be understood as requiring such separation in all implementations, and in some implementations the described components, modules, devices or servers can generally be integrated together in a single component, module, device or server.

The communication module 202 can be software including routines for handling communications between the charge system 191 and other components of the computing device 200. In some implementations, the communication module 202 can be a set of instructions executable by the processor 225 to provide the functionality described below for handling communications between the charge system 191 and other components of the computing device 200. In some implementations, the communication module 202 can be stored in the memory 227 of the computing device 200 and can be accessible and executable by the processor 225. The communication module 202 may be adapted for cooperation and communication with the processor 225 and other components of the computing device 200 via a signal line 222.

The communication module 202 sends and receives data, via the communication unit 245, to and from one or more of the client device 103, the server 113, the DR server 101, the calendar server 151, the social network server 155, the charge station 193, and the power system 195 depending upon where the charge system 191 is stored. For example, the communication module 202 receives, via the communication unit 245, calendar data associated with a user from the calendar server 151 and sends the calendar data to the departure estimation module 204. In another example, the communication module 202 receives graphical data for providing a user interface to a user from the user interface module 216 and sends the graphical data to the client device 103, causing the client device 103 to present the user interface to the user.

In some implementations, the communication module 202 receives data from components of the charge system 191 and stores the data in one or more of the storage device 241 and the memory 227. For example, the communication module 202 receives data describing a charging schedule from the schedule module 212 and stores the data in the storage device 241. In some implementations, the communication module 202 retrieves data from the storage device 241 or the memory 227 and sends the data to one or more components of the charge system 191. For example, the communication module 202 receives discharging history data 289 from the memory 227 and sends the discharging history data 289 to the discharging determination module 208.

In some implementations, the communication module 202 may handle communications between components of the charge system 191. For example, the communication module 202 receives data describing a charging schedule from the schedule module 212 and sends the data to the schedule implementation module 214.

The departure estimation module 204 can be software including routines for estimating a departure time for a vehicle associated with a user. In some implementations, the departure estimation module 204 can be a set of instructions executable by the processor 225 to provide the functionality described below for estimating a departure time for a vehicle associated with a user. In some implementations, the departure estimation module 204 can be stored in the memory 227 of the computing device 200 and can be accessible and executable by the processor 225. The departure estimation module 204 may be adapted for cooperation and communication with the processor 225 and other components of the computing device 200 via a signal line 224.

In some implementations, the departure estimation module 204 receives historical journey data associated with the vehicle or the user from the memory 227 or the storage device 241 and estimates a departure time for the vehicle based on the historical journey data. For example, if the historical journey data indicates that the user usually drives to work from home between 8:00 AM and 8:30 AM in weekdays, the departure estimation module 204 estimates a departure time in a weekday morning as 8:00 AM.

In some implementations, the departure estimation module 204 receives time synchronicity data from the memory 227 and determines a synchronized local time associated with the vehicle based on the time synchronicity data. The departure estimation module 204 receives weather data from a weather server (not shown), calendar data from the calendar server 151, and social network data from the social network server 155. The departure estimation module 204 determines the departure time for the vehicle based on one or more of the synchronized local time, the weather data, the calendar data, and the social network data. For example, if the calendar data indicates that the user has a doctor appointment at 9:00 AM in a next morning and a travel time from home to the doctor's office is less than half an hour, the departure estimation module 204 may estimate a departure time from home in the next morning as 8:30 AM. However, if the weather data indicates that there may be a snow storm in the next morning, the departure estimation module 204 may estimate the departure time in the next morning as 8:15 AM in case the user leaves home earlier and needs more time to travel to the doctor's office due to the snow storm.

In some implementations, the departure estimation module 204 sends data describing the departure time to one or more of the event analysis module 206, the state determination module 210, and the schedule module 212. In some other implementations, the departure estimation module 204 stores the data in the storage device 241 or the memory 227.

The event analysis module 206 can be software including routines for analyzing DR event data. In some implementations, the event analysis module 206 can be a set of instructions executable by the processor 225 to provide the functionality described below for analyzing DR event data. In some implementations, the event analysis module 206 can be stored in the memory 227 of the computing device 200 and can be accessible and executable by the processor 225. The event analysis module 206 may be adapted for cooperation and communication with the processor 225 and other components of the computing device 200 via a signal line 280.

The event analysis module 206 receives DR event data describing one or more DR events from the DR event notification application 111. The event analysis module 206 analyzes the DR event data to determine one or more DR event periods. The one or more DR event periods may occur after a charging connection time and before the departure time. The charging connection time may indicate a time when the battery system 197 is connected to a power source such as the charge station 193 and is ready to be charged by the charge station 193. In some implementations, the one or more DR event periods may represent one or more peak demand periods during which a vehicle may not be charged. Each DR event period may include a corresponding event start time and a corresponding event end time.

The event analysis module 206 may also determine one or more available charging periods based on the DR event data. The one or more available charging periods may be one or more time periods during which the vehicle may be charged. Similar to the one or more DR event periods, the one or more available charging periods also occur after the charging connection time and before the departure time. In some implementations, a time period starting from the charging connection time and ending at the departure time may be separated into one or more available charging periods and one or more DR event periods, where the one or more available charging periods interleave with the DR event periods within the time period.

For example, assume a vehicle is connected to a power outlet at home at 5:00 PM. The vehicle is estimated to depart from home at 8:00 AM in the next morning. The DR event data indicates that a DR event period starts from 8:00 PM and lasts until 12:00 AM in the midnight. In other words, the event start time for the DR event period is 8:00 PM, and the event end time for the DR event period is 12:00 AM. The event analysis module 206 determines a first available charging period as a time period from 5:00 PM to 8:00 PM, a DR event period as a time period from 8:00 PM to 12:00 AM, and a second available charging period as a time period from 12:00 AM to 8:00 AM in the next morning.

In some implementations, the event analysis module 206 sends data describing the one or more DR event periods to one or more of the discharging determination module 208, the state determination module 210, and the schedule module 212. The event analysis module 206 sends data describing the one or more available charging periods to one or more of the state determination module 210 and the schedule module 212. In some other implementations, the event analysis module 206 stores data describing the one or more DR event periods and the one or more available charging periods in the memory 227 or the storage device 241.

The discharging determination module 208 can be software including routines for determining one or more amounts of power to be discharged from the battery system 197 to the power system 195 during one or more DR event periods. In some implementations, the discharging determination module 208 can be a set of instructions executable by the processor 225 to provide the functionality described below for determining one or more amounts of power to be discharged from the battery system 197 to the power system 195 during one or more DR event periods. In some implementations, the discharging determination module 208 can be stored in the memory 227 of the computing device 200 and can be accessible and executable by the processor 225. The discharging determination module 208 may be adapted for cooperation and communication with the processor 225 and other components of the computing device 200 via a signal line 226.

The discharging determination module 208 receives data describing one or more DR event periods from the event analysis module 206. The discharging determination module 208 determines one or more amounts of power to be discharged from the battery system 197 to the power system 195 during the one or more DR event periods as described below.

In some implementations, the discharging determination module 208 receives a discharging history associated with the vehicle from the memory 227 or the storage device 241 and determines one or more amounts of power to be discharged during the one or more DR event periods based on the discharging history. For example, assume there are two DR event periods. The discharging history indicates that usually 10% or 15% of the power capacity of the battery system 197 was discharged during a DR event period. The discharging determination module 208 may determine a first amount of power to be discharged during a first DR event period as 10% of the power capacity of the battery system 197 and a second amount of power to be discharged during a second DR event period as 15% of the power capacity of the battery system 197.

In some implementations, the discharging determination module 208 may determine a discharging rate based on the discharging history. The discharging determination module 208 may determine an amount of power to be discharged for a particular DR event period based on: (1) the discharging rate; and (2) a discharging time duration in the particular DR event period that can be used to discharge power from the battery system 197. For example, the discharging determination module 208 may determine the amount of power to be discharged during the DR event period as a multiplication product of the discharging rate and the time duration in the DR event period (e.g., the amount of power to be discharged=the discharging rate×the discharging time duration). In some examples, the discharging time duration may be part of the particular DR event period and may include one or more discharging time slots. In some other examples, the discharging time duration may be equal to the DR event period.

In some other implementations, the discharging determination module 208 determines the one or more amounts of power to be discharged during the one or more DR event periods based on one or more of power rate data and power demand during the one or more DR event periods. For example, if there is a severe power shortage in a region where the vehicle locates, the discharging determination module 208 may determine to discharge the battery system 197 using a maximal discharging rate during a DR event period. In this example, a maximal amount of power can be discharged from the battery system 197 to the power system 195 during the DR event period. The maximal amount of power to be discharged during the DR event period may be equal to a multiplication product of the maximal discharging rate and the discharging time duration in the DR event period (e.g., the maximal amount of power to be discharged=the maximal discharging rate×the discharging time duration).

In another example, if the power rate during a DR event period is much higher than power rates in other times, the discharging determination module 208 may determine to discharge power from the battery system 197 to a home energy management system using a maximal discharging rate during the DR event period. In this example, a maximal amount of power can be discharged from the battery system 197 to the home energy management system during the DR event period. Thus, the home energy management system may use as less power as possible from the regional power grid system during the DR event period. After discharging power from the battery system 197 to the home energy management system, the battery system 197 may be recharged during a following available charging period, since the power rate in the following available charging period is much lower than the power rate in the DR event period.

In some implementations, the discharging determination module 208 sends data describing the one or more amounts of power to be discharged to the state determination module 210. In some other implementations, the discharging determination module 208 stores the data describing the one or more amounts of power to be discharged in the memory 227 or the storage device 241.

The state determination module 210 can be software including routines for determining an available state zone for the vehicle. In some implementations, the state determination module 210 can be a set of instructions executable by the processor 225 to provide the functionality described below for determining an available state zone for the vehicle. In some implementations, the state determination module 210 can be stored in the memory 227 of the computing device 200 and can be accessible and executable by the processor 225. The state determination module 210 may be adapted for cooperation and communication with the processor 225 and other components of the computing device 200 via a signal line 228.

The state determination module 210 determines a current state of charge for the battery system 197 at the charging connection time when the vehicle is connected to the charge station 103. The state determination module 210 also determines a target state of charge for the battery system 197 at the departure time. In some implementations, the state determination module 210 determines the target state of charge based on journey data associated with the user. For example, if the journey data indicates that the user usually drives the vehicle to work during weekdays, the state determination module 210 may determine a target state of charge for a weekday morning as 70% full of the battery system 197. However, if the journey data indicates that the user usually takes a long-distance trip on Saturdays, the state determination module 210 may determine a target state of charge for a Saturday morning as 100% full of the battery system 197.

The state determination module 210 receives data describing one or more amounts of power to be discharged during the one or more DR event periods from the discharging determination module 208. The state determination module 210 determines an available state zone for the vehicle based on one or more of the current state of charge at the charging connection time, the target state of charge at the departure time, and the one or more amounts of power to be discharged during the one or more DR event periods.

Figure 5A:
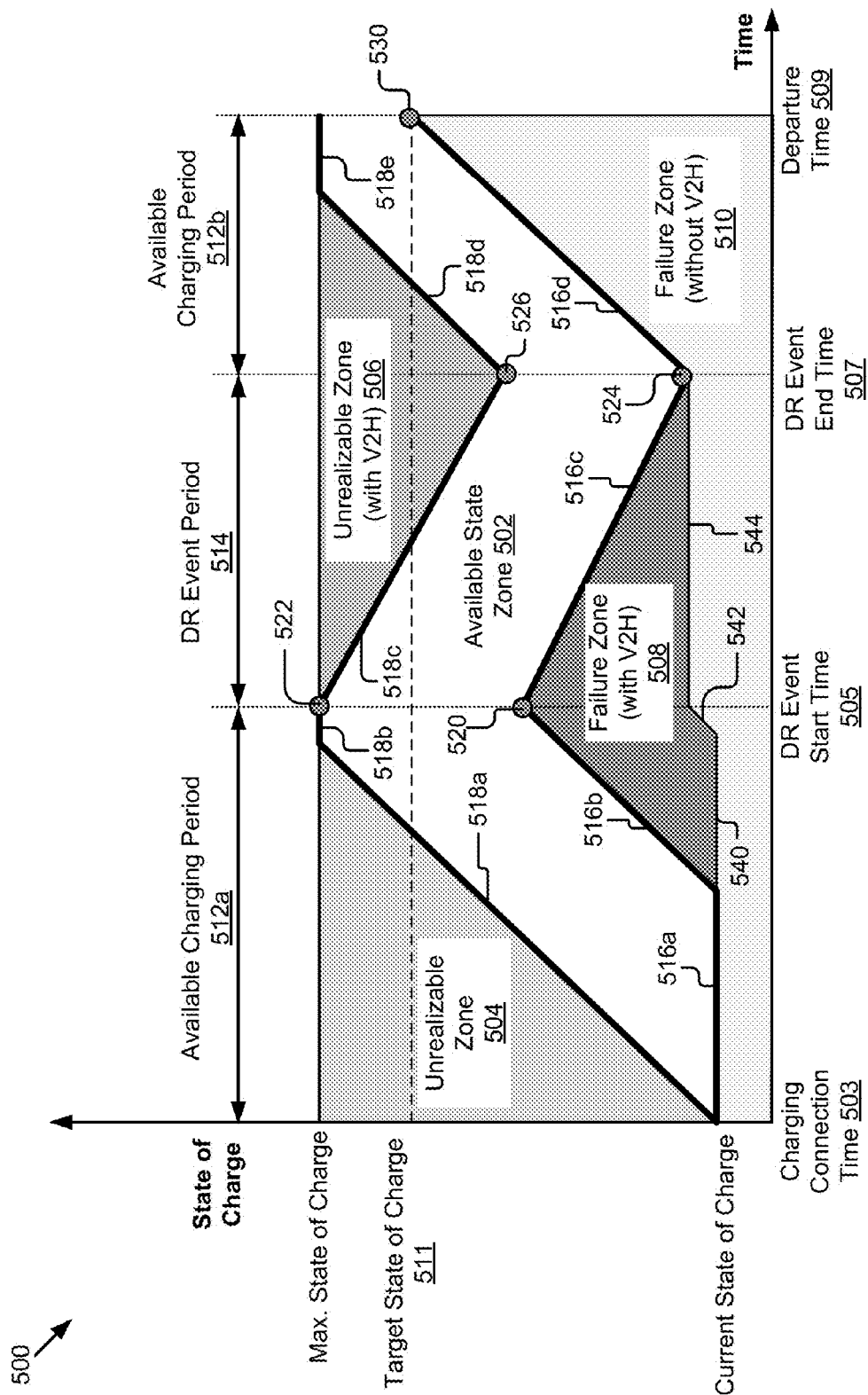
FIGS. 5A and 5B are graphic representations illustrating examples of available state zones.
Figure 5B:
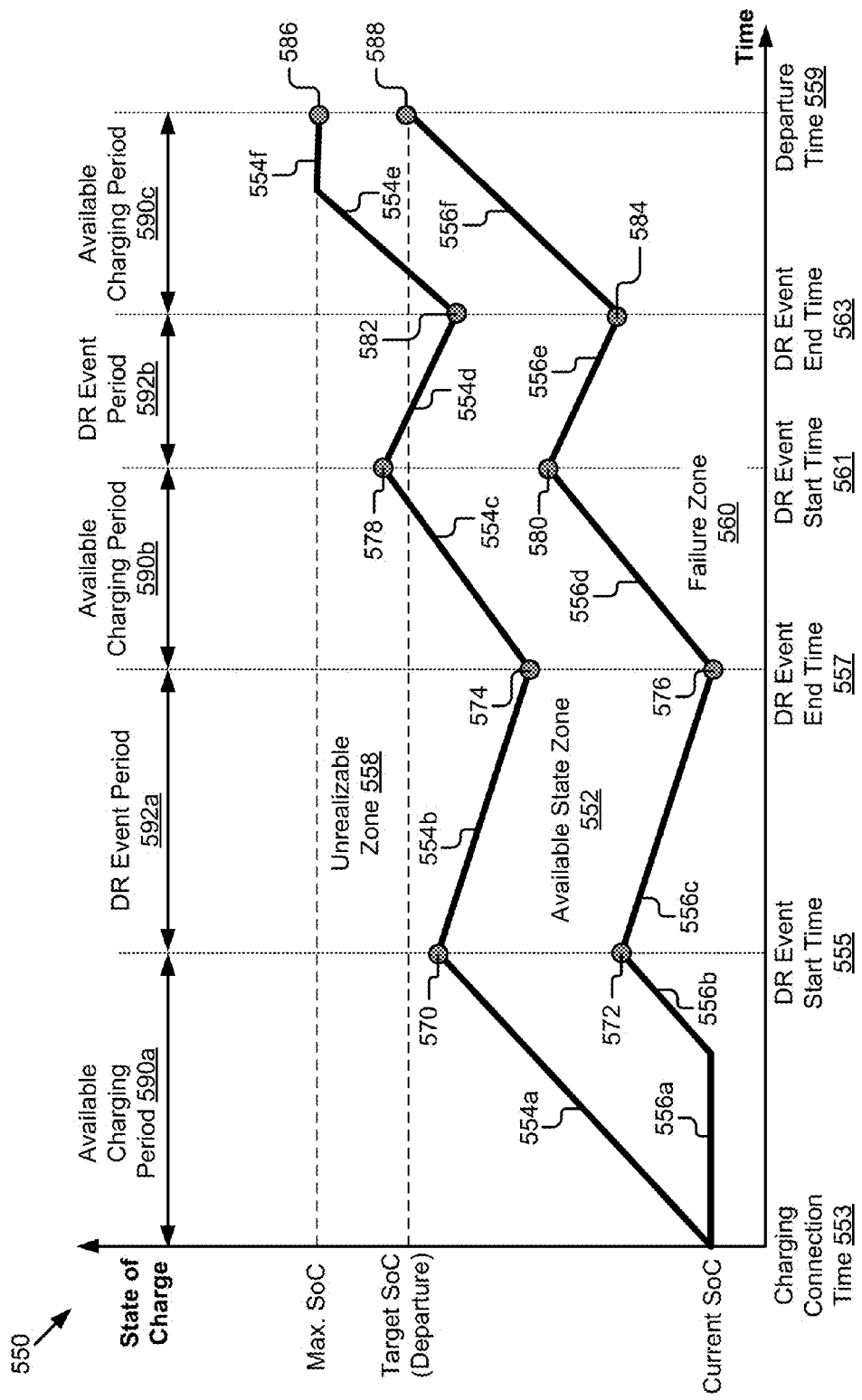

The available state zone may be a zone including possible states of charge for the battery system 197 during a time period beginning from the charging connection time and ending at the departure time. The time period includes one or more available charging periods and one or more DR event periods. In some implementations, the available state zone satisfies one or more of the following conditions: (1) a state of charge at the departure time satisfies the target state of charge (e.g., the state of charge in the available state zone at the departure time≥the target state of charge); (2) vehicle charging may be performed during the one or more available charging periods; (3) no vehicle charging is performed during the one or more DR event periods; and (4) one or more amounts of power may be discharged from the battery system 197 during the one or more DR event periods. Examples of available state zones are illustrated in FIGS. 5A and 5B.

In some implementations, the available state zone includes an upper bound and a lower bound. The upper bound may describe an upper limit for the possible states of charge that satisfy the available state zone. For example, the upper bound describes an upper limit for possible states of charge that satisfy: (1) vehicle charging may be performed during the one or more available charging periods; (2) one or more amounts of power may be discharged from the battery system 197 during the one or more DR event periods; and (3) the state of charge at the departure time satisfies the target state of charge (e.g., the state of charge at the departure time=a maximal achievable state of charge such as 100% full of the battery system 197).

The lower bound may describe a lower limit for the possible states of charge that satisfy the available state zone. For example, the lower bound describes a lower limit for possible states of charge that satisfy: (1) vehicle charging may be performed during the one or more available charging periods; (2) one or more amounts of power may be discharged from the battery system 197 during the one or more DR event periods; and (3) the state of charge at the departure time satisfies the target state of charge (e.g., the state of charge at the departure time=the target state of charge).

For each DR event start time, the available state zone has: (1) a maximal achievable state of charge, which is the state of charge at the DR event start time in the upper bound; and (2) a minimal state of charge, which is the state of charge at the DR event start time in the lower bound. The maximal achievable state of charge at the DR event start time may be equal to or less than the maximal state of charge of the battery system 197 (e.g., the maximal achievable state of charge≤100% full of the battery system 197). Similarly, for each DR event end time, the available state zone has: (1) a maximal achievable state of charge, which is the state of charge at the DR event end time in the upper bound; and (2) a minimal state of charge, which is the state of charge at the DR event end time in the lower bound.

The state determination module 210 determines a sequence of states that satisfies the available state zone. The sequence of states includes one or more states of charge at the one or more DR event start times (also referred to as "one or more start states of charge") and one or more states of charge at the one or more DR event end times (also referred to as "one or more end states of charge"). A start state of charge at a DR event start time satisfies the maximal achievable state of charge and the minimal state of charge at the corresponding DR event start time (e.g., the minimal state of charge at the DR event start time≤the start state of charge at the DR event start time≤the maximal achievable state of charge at the DR event start time). An end state of charge at a DR event end time satisfies the maximal achievable state of charge and the minimal state of charge at the corresponding DR event end time (e.g., the minimal state of charge at the DR event end time≤the end state of charge at the DR event end time≤the maximal achievable state of charge at the DR event end time).

In some implementations, the sequence of states is configured to maximize a total gain for the vehicle in a charging-discharging process. A charging-discharging process may be a process that charges the battery system 197 during one or more available charging periods and discharges the battery system 197 during one or more DR event periods. The start states of charge and the end states of charge in the sequence of states that maximize the total gain may be referred to as "optimal start states of charge" and "optimal end states of charge" respectively. In some examples, the total gain may be equal to a discharging gain minus a charging cost.

The charging cost includes a power cost incurred by charging the battery system 197 to achieve the one or more start states of charge at the one or more DR event start times and to achieve the target state of charge at the departure time. The discharging gain includes a gain obtained from discharging the one or more amounts of power to the power system 195 during the one or more DR event periods. For example, the discharging gain may include a gain obtained from selling the one or more amounts of power to a power grid system during the one or more DR event periods. In another example, the discharging gain may include a gain obtained from discharging the one or more amounts of power to a home energy management system during the one or more DR event periods. In this example, the home management system does not need to use power from the power grid system or reduces the power usage from the power grid system during the one or more DR event periods.

In some implementations, the state determination module 210 sends the sequence of states that includes one or more start states of charge at one or more DR event start times and one or more end states of charge at one or more DR event end times to the schedule module 212. In some other implementations, the state determination module 210 stores the sequence of states in the memory 227 or the storage device 241.

The schedule module 212 can be software including routines for determining a charging schedule during one or more available charging periods and a discharging schedule during one or more DR event periods for the vehicle. In some implementations, the schedule module 212 can be a set of instructions executable by the processor 225 to provide the functionality described below for determining a charging schedule during one or more available charging periods and a discharging schedule during one or more DR event periods for the vehicle. In some implementations, the schedule module 212 can be stored in the memory 227 of the computing device 200 and can be accessible and executable by the processor 225. The schedule module 212 may be adapted for cooperation and communication with the processor 225 and other components of the computing device 200 via a signal line 230.

In some implementations, the schedule module 212 receives power rate data from the server 113 or a utility server (not shown). The schedule module 212 receives one or more start states of charge at one or more DR event start times, one or more end states of charge at one or more DR event end times, a current state of charge at the charging connection time, and a target state of charge at the departure time from the state determination module 210. The schedule module 212 determines a charging schedule for the vehicle based on the power rate data, the one or more start states of charge, the one or more end states of charge, the current state of charge, and the target state of charge so that the charging schedule satisfies the one or more start states of charge at the one or more DR event start times and the target state of charge at the departure time.

For each available charging period, the charging schedule may include one or more charging time slots from the corresponding available charging period for charging the battery system 197 during the corresponding available charging period. In some implementations, the one or more charging time slots may be time slots having the lowest power rates within the available charging period. For two or more time slots in the available charging period that have the same power rate, the schedule module 212 may select the time slots that are earlier in time as the charging time slots.

In some implementations, the schedule module 212 determines a discharging schedule for the vehicle based on the power rate data and the one or more amounts of power to be discharged from the battery system 197 during the one or more DR event periods. For example, the schedule module 212 may select one or more cost-effective time slots in a DR event period as one or more discharging time slots so that the power cost in a home energy management system is minimized or a reward to sell the power to a power grid system is maximized. In some examples, the one or more cost-effective time slots in the DR event period may be time slots having the highest power rates. In some other examples, the one or more cost-effective time slots in the DR event period may be time slots having the highest rewards. For each DR event period, the discharging schedule may include one or more cost-effective time slots within the corresponding DR event period for discharging the battery system 197 during the corresponding DR event period.

For example, assume that the state determination module 210 determines a sequence of states including a start state of charge at a DR event start time and an end state of charge at a DR event end time that maximizes a total gain. In other words, a maximized total gain is achieved if: (1) the battery system 197 is to be charged from a current state of charge to the start state of charge at the DR event start time during a first available charging period; (2) the battery system 197 is to be discharged from the start state of charge at the DR event start time to the end state of charge at the DR event end time during a DR event period; and (3) the battery system 197 is to be charged from the end state of charge at the DR event end time to the target state of charge at the departure time during a second available charging period.

The schedule module 212 selects one or more first charging time slots that have the lowest power rates from the first available charging period so that the one or more first charging time slots can be used to charge the battery system 197 from the current state of charge to the start state of charge during the first available charging period. The schedule module 212 selects one or more discharging time slots that have the highest power rates from the DR event period so that the one or more discharging time slots can be used to discharge the battery system 197 from the start state of charge to the end state of charge during the DR event period. The schedule module 212 selects one or more second charging time slots that have the lowest power rates from the second available charging period so that the one or more second charging time slots can be used to charge the battery system 197 from the end state of charge to the target state of charge during the second available charging period. The charging schedule for the vehicle includes the one or more first charging time slots in the first available charging period and the one or more second charging time slots in the second available charging period. The discharging schedule includes the one or more discharging time slots in the DR event period.

In some implementations, the schedule module 212 sends data describing the charging schedule and the discharging schedule to the schedule implementation module 214. In some other implementations, the schedule module 212 stores the data describing the charging schedule and the discharging schedule in the memory 227 or the storage device 241.

The schedule implementation module 214 can be software including routines for implementing a charging schedule and a discharging schedule for the vehicle. In some implementations, the schedule implementation module 214 can be a set of instructions executable by the processor 225 to provide the functionality described below for implementing a charging schedule and a discharging schedule for the vehicle. In some implementations, the schedule implementation module 214 can be stored in the memory 227 of the computing device 200 and can be accessible and executable by the processor 225. The schedule implementation module 214 may be adapted for cooperation and communication with the processor 225 and other components of the computing device 200 via a signal line 232.

The schedule implementation module 214 receives data describing a charging schedule and a discharging schedule from the schedule module 212. The schedule implementation module 214 charges the battery system 197 in the vehicle based on the charging schedule. For example, the schedule implementation module 214 charges the battery system 197 using one or more charging time slots specified in the charging schedule. The schedule implementation module 214 discharges the battery system 197 in the vehicle based on the discharging schedule. For example, the schedule implementation module 214 discharges the battery system 197 using one or more discharging time slots specified in the discharging schedule.

The user interface module 216 can be software including routines for generating graphical data for providing user interfaces. In some implementations, the user interface module 216 can be a set of instructions executable by the processor 225 to provide the functionality described below for generating graphical data for providing user interfaces. In some implementations, the user interface module 216 can be stored in the memory 227 of the computing device 200 and can be accessible and executable by the processor 225. The user interface module 216 may be adapted for cooperation and communication with the processor 225 and other components of the computing device 200 via a signal line 234.

In some implementations, the user interface module 216 generates graphical data for providing a user interface that depicts a charging schedule and a discharging schedule for a user. The user interface module 216 sends the graphical data to a client device 103 (e.g., a smartphone, a tablet, etc.), causing the client device 103 to present the user interface to the user. The user may approve or disapprove the charging schedule and the discharging schedule using the user interface. In some implementations, the user interface module 216 generates graphical data for providing a user interface that notifies the user of a total gain obtained during the charging-discharging process. The user interface module 216 may generate graphical data for providing other user interfaces to users.

Methods

Figure 3:
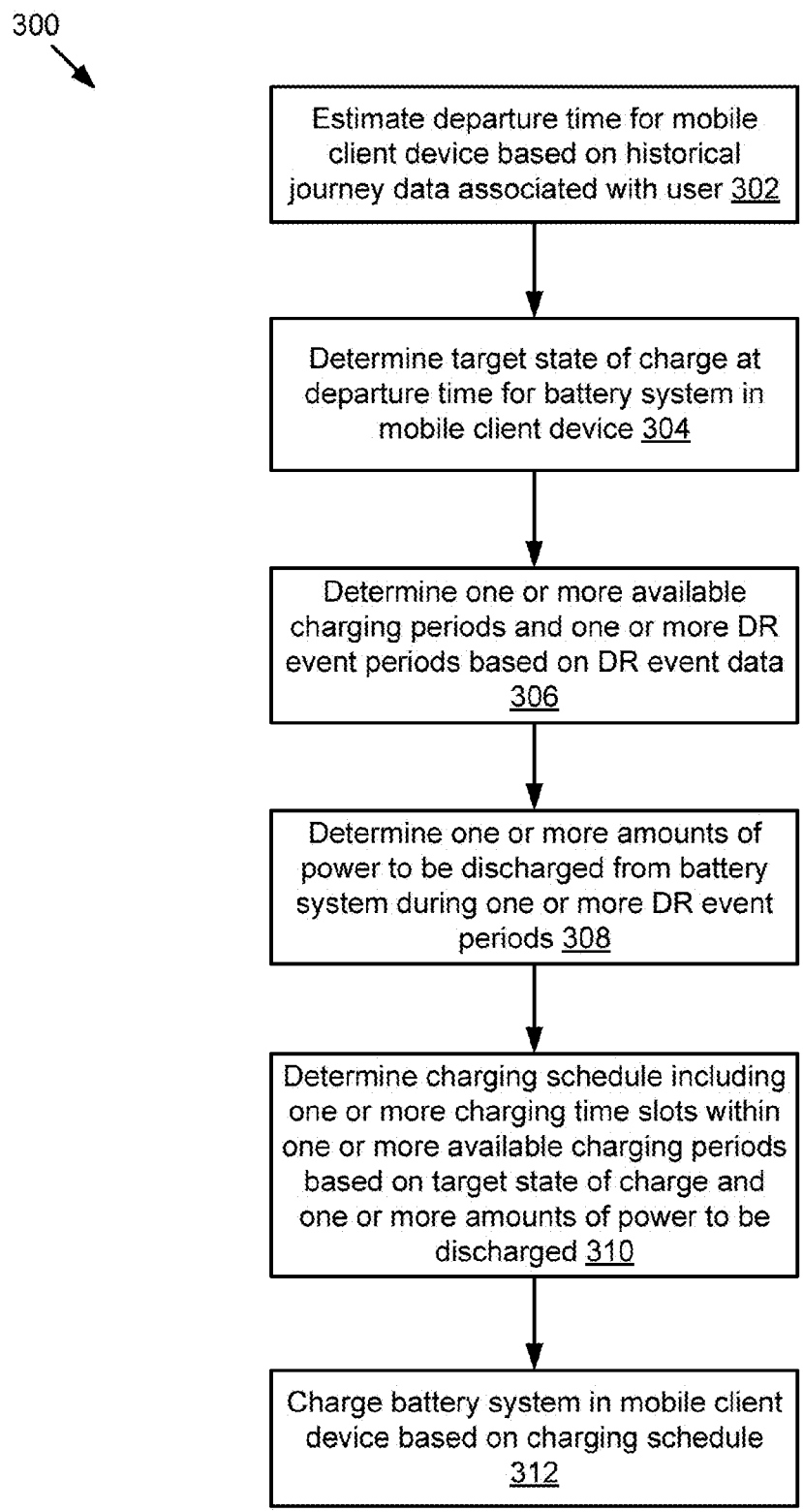
FIG. 3 is a flowchart of an example method for providing charging services to a mobile client device.

Referring now to FIG. 3, an example of a method 300 for providing charging services to mobile client devices is described. In some implementations, the departure estimation module 204 estimates 302 a departure time for a mobile client device (e.g., a vehicle) based on historical journey data associated with a user operating on the mobile client device. The mobile client device includes the battery system 197. The state determination module 210 determines 304 a target state of charge at the departure time for the battery system 197 in the mobile client device. The event analysis module 206 determines 306 one or more available charging periods and one or more DR event periods based on DR event data. The discharging determination module 208 determines 308 one or more amounts of power to be discharged from the battery system 197 to the power system 195 during the one or more DR event periods. The schedule module 212 determines 310 a charging schedule including one or more charging time slots within the one or more available charging periods based at least in part on the target state of charge and the one or more amounts of power to be discharged. The schedule implementation module 214 charges 312 the battery system 197 in the mobile client device based on the charging schedule.

Figure 4A:
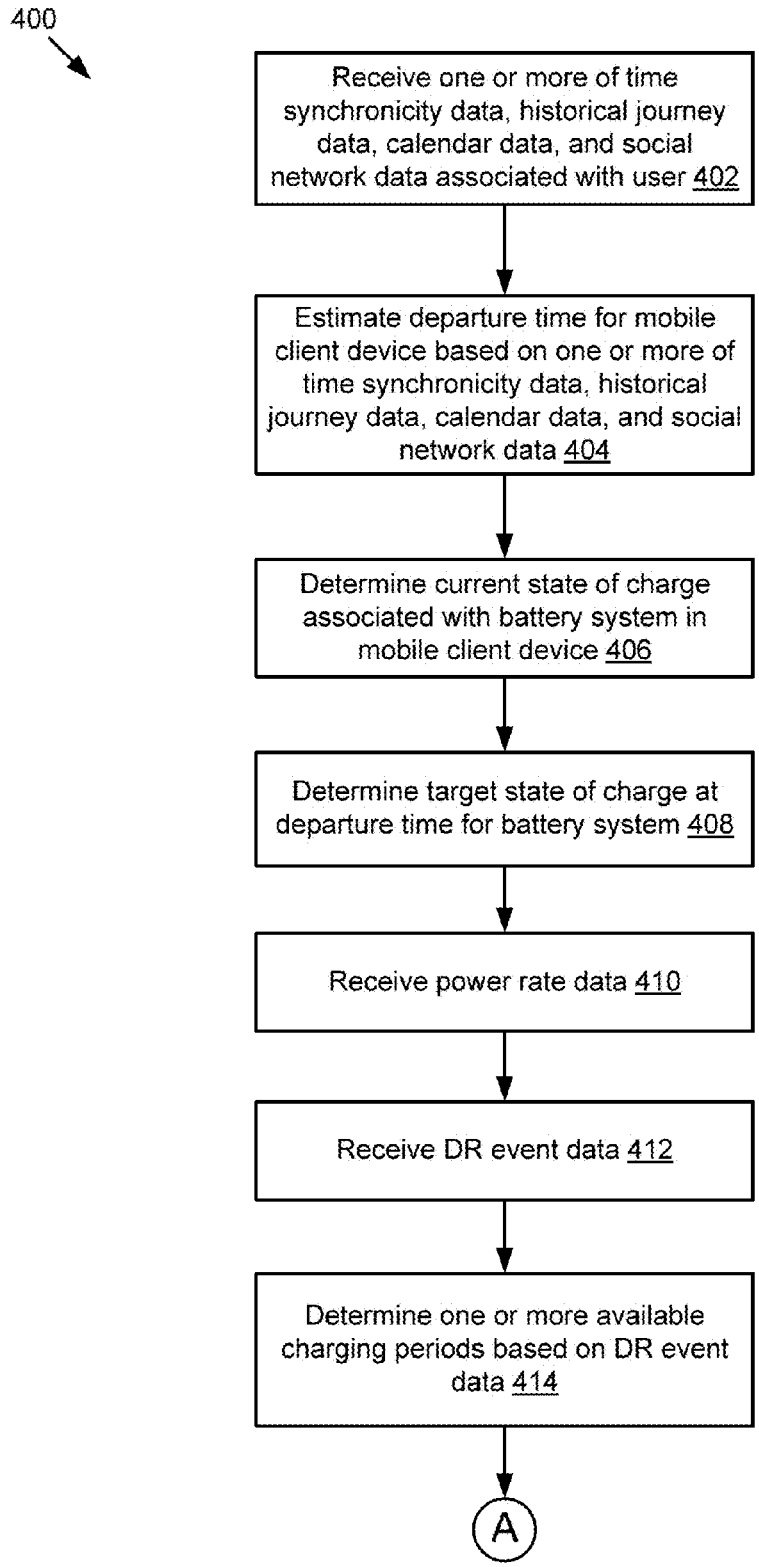
FIGS. 4A-4C are flowcharts of another example method for providing charging services to a mobile client device.
Figure 4B:
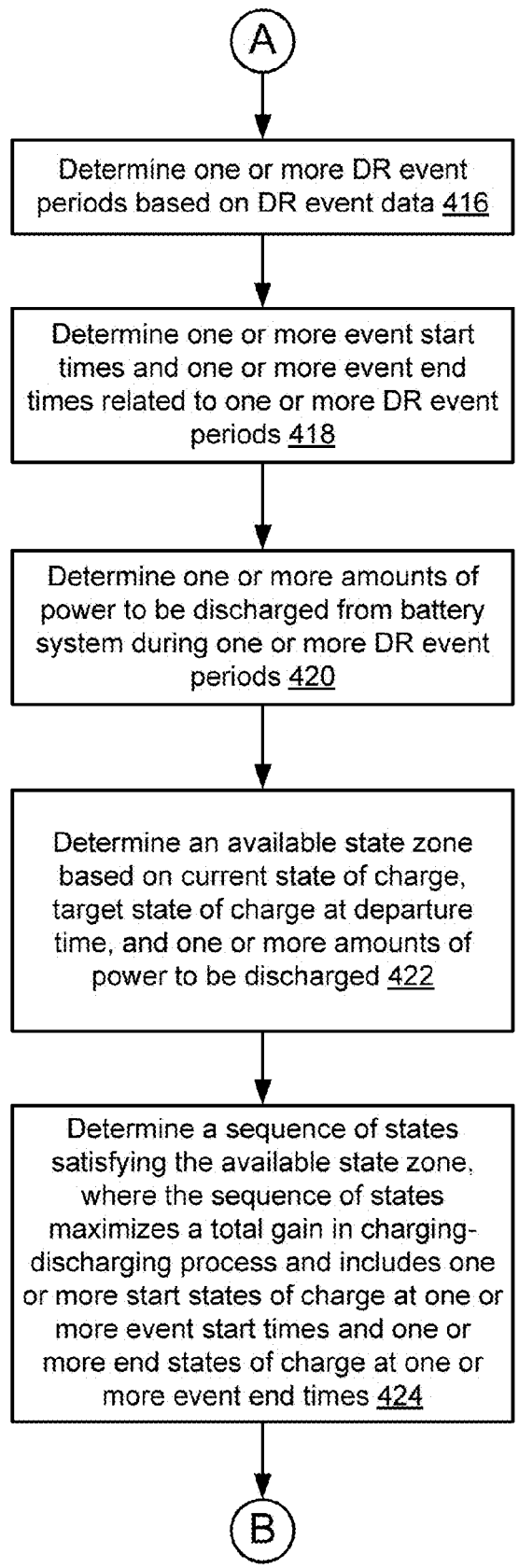
Figure 4C:
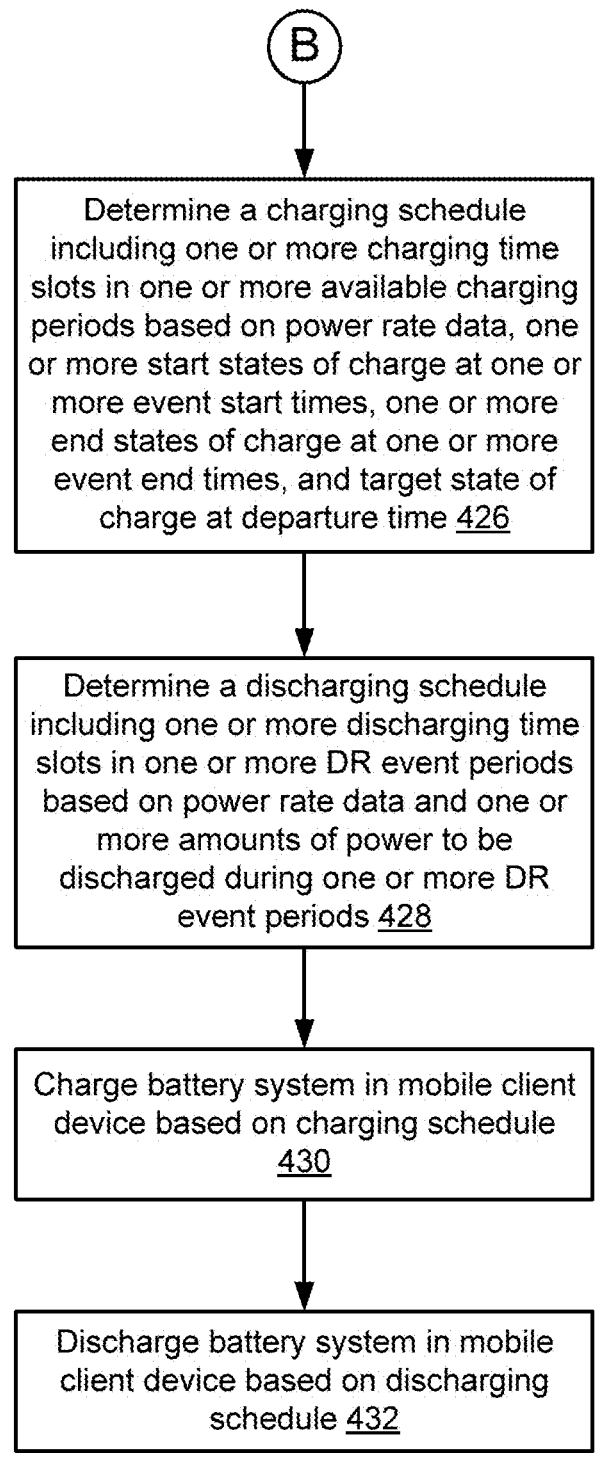

FIGS. 4A-4C are flowcharts of another example method 400 for providing charging services to mobile client devices. Referring to FIG. 4A, the communication module 202 receives 402 one or more of time synchronicity data, historical journey data, calendar data, and social network data associated with a user. The departure estimation module 204 estimates 404 a departure time for a mobile client device operated by the user based on one or more of the time synchronicity data, the historical journey data, the calendar data, and the social network data. The state determination module 210 determines 406 a current state of charge associated with the battery system 197 in the mobile client device. The state determination module 210 determines 408 a target state of charge at the departure time for the battery system 197. The communication module 202 receives 410 power rate data from the server 113 or a utility server (not shown). The communication module 202 receives 412 DR event data from the DR server 101. The event analysis module 206 determines 414 one or more available charging periods based on the DR event data.

Referring to FIG. 4B, the event analysis module 206 determines 416 one or more DR event periods based on the DR event data. The event analysis module 206 determines 418 one or more event start times and one or more event end times related to the one or more DR event periods. Each DR event has a corresponding event start time and a corresponding event end time. The discharging determination module 208 determines 420 one or more amounts of power to be discharged from the battery system 197 to the power system 195 during the one or more DR event periods.

The state determination module 210 determines 422 an available state zone for the mobile client device based on one or more of the current state of charge, the target state of charge at the departure time, and the one or more amounts of power to be discharged during the one or more DR event periods. The state determination module 210 determines 424 a sequence of states satisfying the available state zone. The sequence of states maximizes a total gain in a charging-discharging process of the mobile client device. The sequence of states includes one or more start states of charge at the one or more event start times and one or more end states of charge at the one or more event end times.

Referring to FIG. 4C, the schedule module 212 determines 426 a charging schedule including one or more charging time slots in the one or more available charging periods based on one or more of the power rate data, the one or more start states of charge at the one or more event start times, the one or more end states of charge at the one or more event end times, and the target state of charge at the departure time. The schedule module 212 determines 428 a discharging schedule including one or more discharging time slots in the one or more DR event periods based on the power rate data and the one or more amounts of power to be discharged during the one or more DR event periods. The schedule implementation module 214 charges 430 the battery system 197 in the mobile client device based on the charging schedule. The schedule implementation module 214 discharges 432 the battery system 197 in the mobile client device based on the discharging schedule.

Graphic Representations

FIGS. 5A and 5B are graphic representations 500 and 550 illustrating examples of available state zones. Referring to FIG. 5A, an example available state zone 502 is illustrated. The graphic representation 500 illustrates states of charge of the battery system 197 as a function of time. A time period that begins from a charging connection time 503 and ends at a departure time 509 includes a first available charging period 512a, a DR event period 514, and a second available charging period 512b. The DR event period 514 begins from a DR event start time 505 and ends at a DR event end time 507. The first available charging period 512a begins from the charging connection time 503 and ends at the DR event start time 505. The second available charging period 512b begins from the DR event end time 507 and ends at the departure time 509.

The graphic representation 500 illustrates the available state zone 502, an unrealizable zone 504, an unrealizable zone 506 with V2H, a failure zone 508 with V2H, and a failure zone 510 without V2H. The unrealizable zone 504 describes a zone that is unachievable even if the battery system 197 is charged immediately after connecting to a power source such as the charge station 193. This immediate charging process is illustrated by line 518a. The discharging determination module 208 may determine an amount of power to be discharged from the battery system 197 to a home energy management system (or, a power grid system) during the DR event period 514. The unrealizable zone 506 with V2H describes a zone which is unrealizable if the amount of power is discharged from the battery system 197 to the home energy management system (or, the power grid system) during the DR event period 514.

The failure zone 508 with V2H describes a zone failing to achieve a target state of charge 511 at the departure time 509 if the amount of power is discharged from the battery system 197 during the DR event period 514. In other words, when a state of charge of the battery system 197 falls within the failure zone 508, it is impossible to achieve the target state of charge 511 at the departure time 509 if the amount of power is discharged from the battery system 197 during the DR event period 514. The failure zone 510 without V2H describes a zone failing to achieve the target state of charge 511 at the departure time 509 even if no power is discharged from the battery system 197 during the DR event period 514.

The available state zone 502 includes an upper bound formed by lines 518a, 518b, 518c, 518d, and 518e. Each line 518a-518e represents a corresponding state transition path for the upper bound. A state transition path describes a path along which the state of charge changes as a function of time. For example, line 518a represents a state transition path describing how the state of charge of the battery system 197 changes when the battery system 197 is charged immediately after connecting to the charge station 193. A point 522 in the upper bound represents a maximal achievable state of charge at the DR event start time 505. A point 526 in the upper bound represents a maximal achievable state of charge at the DR event end time 507 if the amount of power is discharged from the battery system 197 during the DR event period 514. A different between the maximal achievable state of charge at the point 522 and the maximal achievable state of charge at the point 526 is equal to the amount of power discharged from the battery system 197.

The available state zone 502 also includes a lower bound formed by lines 516a, 516b, 516c, and 516d. Each line 516a-516d represents a corresponding state transition path for the lower bound. A point 530 in the lower bound represents a minimal state of charge to be achieved at the departure time 509, which is equal to the target state of charge 511. A point 524 in the lower bound represents a minimal state of charge at the DR event end time 507. Line 516d represents the state transition path from the minimal state of charge at the point 524 to the target state of charge 511 at the point 530. The minimal state of charge at the DR event end time 507 is configured such that: if a state of charge at the DR event end time 507 is smaller than the minimal state of charge at the point 524, the target state of charge 511 may not be achieved at the departure time 509 even if the battery system 197 is charged using all the time slots in the available charging period 512b.

A point 520 in the lower bound represents a minimal state of charge at the DR event start time 505. The minimal state of charge at the DR event start time 505 is configured such that: (1) the amount of power can be discharged from the battery system 197 during the DR event period 514; and (2) the end state of charge at the DR event end time 507 is equal to the minimal state of charge at the point 524. In some implementations, the minimal state of charge at the point 520 is equal to the sum of: (1) the amount of power to be discharged during the DR event period 514; and (2) the minimal state of charge at the point 524. Line 516c represents a state transition path from the minimal state of charge at the point 520 to the minimal state of charge at the point 524 when the amount of power is discharged from the battery system 197 during the DR event period 514.

Line 516b represents a state transition path having the latest charging start time and capable of achieving the minimal state of charge at the point 520. Line 516a represents a state transition path describing that the battery system 197 is not charged and the state of charge keeps unchanged along the path.

In some implementations, if no power is discharged from the battery system 197 during the DR event period 514, the battery system 197 may be charged according to state transition paths represented by lines 516a, 540, 542, 544, and 516d. These state transition paths have the latest charging start time and also achieve the target state of charge 511 at the departure time 509.

Referring to FIG. 5B, another example available state zone 552 is illustrated. Similar to the graphic representation 500 in FIG. 5A, the graphic representation 550 illustrates states of charge of the battery system 197 as a function of time. A time period that begins from a charging connection time 553 and ends at a departure time 559 includes a first available charging period 590a, a first DR event period 592a, a second available charging period 590b, a second DR event period 592b, and a third available charging period 590c.

The first DR event period 592a begins from a first DR event start time 555 and ends at a first DR event end time 557. The second DR event period 592b begins from a second DR event start time 561 and ends at a second DR event end time 563. The first available charging period 590a begins from the charging connection time 553 and ends at the first DR event start time 555. The second available charging period 590b begins from the first DR event end time 557 and ends at the second DR event start time 561. The third available charging period 590c begins from the second DR event end time 563 and ends at the departure time 559.

The available state zone 552 includes an upper bound formed by lines 554a, 554b, 554c, 554d, 554e, and 554f. Each line 554a-554f represents a corresponding state transition path for the upper bound. For example, line 554a represents a state transition path describing how the state of charge changes if the battery system 197 is charged immediately after connecting to a power source such as the charge station 193. Line 554b represents a state transition path describing how the state of charge changes from a point 570 to a point 574 if an amount of power is discharged from the battery system 197 during the first DR event period 592a. The available state zone 552 also includes a lower bound formed by lines 556a, 556b, 556c, 556d, 556e, and 556f. Each line 556a-556f represents a corresponding state transition path for the lower bound.

The first DR event start time 555 is associated with a maximal start state of charge at the point 570 in the upper bound and a minimal start state of charge at a point 572 in the lower bound. The first DR event end time 557 is associated with a maximal end state of charge at the point 574 in the upper bound and a minimal end state of charge at a point 576 in the lower bound. The second DR event start time 561 is associated with a maximal start state of charge at a point 578 in the upper bound and a minimal start state of charge at a point 580 in the lower bound. The second DR event end time 563 is associated with a maximal end state of charge at a point 582 in the upper bound and a minimal end state of charge at a point 584 in the lower bound. The departure time 559 is associated with a maximal state of charge at a point 586 in the upper bound and a minimal state of charge at a point 588 in the lower bound.

The graphic representation 550 illustrates the available state zone 552, an unrealizable zone 558, and a failure zone 560. The unrealizable zone 558 describes a zone above the upper bound of the available state zone 552. The zone 558 is unachievable if two amounts of power are discharged from the battery system 197 to the power system 195 during the two DR event period 592a and 592b. The failure zone 560 describes a zone below the lower bound of the available state zone 552. The failure zone 560 fails to achieve a target state of charge at the departure time 559. For example, when a state of charge of the battery system 197 falls within the failure zone 560, the target state of charge may not be achieved at the departure time 559 if two amounts of power are discharged from the battery system 197 to the power system 195 during the two DR event periods 592a and 592b.

FIGS. 6A and 6B are graphic representations 600 and 660 illustrating example charging schedules and discharging schedules that are determined based on available state zones and power rate data. Referring to FIG. 6A, the graphic representation 600 illustrates a first graph 603 depicting a power rate as a function of time and a second graph 605 depicting an available state zone 602. A first available charging period 607a (e.g., a time period between a charging connection time and a DR event start time) is associated with a first flat power rate. A second available charging period 607b (e.g., a time period between a DR event end time and a departure time) is associated with a second flat power rate. Since the first flat power rate is lower than the second flat power rate, the battery system 197 will be charged in the first available charging period 607a as much as possible. Thus, the schedule module 212 determines a sequence of states including a start state of charge at the DR event start time and an end state of charge at the DR event end time, where the start state of charge is equal to a maximal start state of charge at a point 608 and the end state of charge is equal to a maximal end state of charge at a point 610 in an upper bound of the available state zone 602. The start state of charge at the point 608 is also equal to a maximal state of charge of the battery system 197. A difference between the start state of charge at the DR event start time and the end state of charge at the DR event end time is equal to an amount of power to be discharged during a DR event period 609.

Since the first power rate associated with the first available charging period 607a is a flat fee, the battery system 197 may be charged from a current state of charge to the start state of charge as early in time as possible. Thus, the schedule module 212 may select charging time slots 604a from the first available charging period 607a, so that the battery system 197 is charged from the current state of charge to the start state of charge as illustrated by a state transition path 606a.

The schedule module 212 may select discharging time slots 605 for discharging the battery system 197 from the start state of charge at the point 608 to the end state of charge at the point 610 as illustrated by a state transition path 606c. In this example, the discharging time slots 605 include all the time slots from the DR event period 609. In other examples, the discharging time slots 605 may include some most cost-effective time slots from the DR event period 609.

Since the second power rate associated with the second available charging period 607b is also a flat fee, the battery system 197 may be charged from the end state of charge to a target state of charge as early in time as possible. Thus, the schedule module 212 selects charging time slots 604b from the second available charging period 607b, so that the battery system 197 is charged from the end state of charge at the point 610 to the target state of charge as illustrated by a state transition path 606d.

As a result, the schedule module 212 determines a charging schedule including the charging time slots 604a from the first available charging period 607a and the charging time slots 604b from the second available charging period 607b. The schedule module 212 determines a discharging schedule including the discharging time slots 605 from the DR event period 609. State transition paths for the battery system 197 according to the charging schedule and the discharging schedule are illustrated by lines 606a, 606b, 606c, 606d, and 606e. The state transition paths 606a-606e may be considered as a piecewise linear function that maximizes a total gain in the charging-discharging process.

Referring to FIG. 6B, the graphic representation 660 illustrates a first graph 663 depicting a power rate as a function of time and a second graph 665 depicting an available state zone 662. The schedule module 212 determines a sequence of states including a start state of charge at a DR event start time (illustrated by a point 668) and an end state of charge at a DR event end time (illustrated by a point 670). The sequence of states satisfies the available state zone 662. The battery system 197 may be charged using charging time slots 664a and 664b that have the lowest power rates based on the start state of charge at the point 668 and the end state of charge at the point 670. A difference between the start state of charge at the DR event start time and the end state of charge at the DR event end time is equal to an amount of power to be discharged during a DR event period 669.

The schedule module 212 determines a charging schedule including: (1) the charging time slots 664a from a first available charging period 667a for charging the battery system 197 from the current state of charge to the start state of charge at the point 668, as illustrated by a state transition path 666a; and (2) the charging time slots 664b from a second available charging period 667b for charging the battery system 197 from the end state of charge to the target state of charge, as illustrated by a state transition path 666e.

The schedule module 212 may select discharging time slots 665 for discharging the battery system 197 from the start state of charge to the end state of charge during the DR event period 669, as illustrated by a state transition path 666c. In this example, the discharging time slots 665 include all the time slots from the DR event period 669. In other examples, the discharging time slots 665 may include some most cost-effective time slots from the DR event period 669.

State transition paths for the battery system 197 according to the charging schedule and the discharging schedule are illustrated by lines 666a, 666b, 666c, 666d, and 666e. The state transition paths 666a-666e may be considered as a piecewise linear function that maximizes a total gain in the charging-discharging process.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   estimating a departure time for a mobile client device associated with a user based on historical journey data associated with the user, wherein the mobile client device is associated with a home;
   determining a target state of charge at the departure time for a battery system included in the mobile client device;
   determining one or more available charging periods and one or more demand response event periods based on demand response event data describing one or more demand response events associated with the one or more demand response event periods during which the mobile client device and the home are requested to reduce power consumption so that neither the mobile client device nor the home receive power from a power grid during the one or more demand response event periods;
   determining one or more amounts of power to be discharged from the battery system included in the mobile client device to the home during the one or more demand response event periods so that the home has access to power during the one or more demand response event periods;
   determining one or more charging time slots within the one or more available charging periods based on the target state of charge at the departure time and the one or more amounts of power to be discharged from the battery system included in the mobile client device to the home during the one or more demand response event periods;
   charging the battery system included in the mobile client device during the one or more charging time slots; and
   discharging, by the battery system of the mobile client device, power to the home during the one or more demand response event periods, wherein the power discharged by the battery system to the home is limited to substantially not exceed the determined one or more amounts of power so that the home has access to power during the one or more demand response event periods without receiving power from the power grid while the mobile client device substantially maintains the target state of charge at the departure time.

2. The method of claim 1, wherein determining the one or more charging time slots comprises:
   receiving power rate data;
   determining a current state of charge of the battery system;

determining one or more event start times and one or more event end times associated with the one or more demand response event periods;

determining an available state zone based on the current state of charge, the target state of charge, and the one or more amounts of power to be discharged during the one or more demand response event periods;

determining a sequence of states satisfying the available state zone, the sequence of states including one or more start states of charge at the one or more event start times and one or more end states of charge at the one or more event end times for the battery system; and determining the one or more charging time slots based on the power rate data, the current state of charge, the one or more start states of charge at the one or more event start times, the one or more end states of charge at the one or more event end times, and the target state of charge at the departure time.

3. The method of claim 2, wherein the sequence of states maximizes a total gain for the mobile client device.

4. The method of claim 3, wherein:

the total gain is equal to a discharging gain minus a charging cost;

the discharging gain includes a gain obtained from discharging the one or more amounts of power to a power system during the one or more demand response event periods; and the charging cost includes a power cost incurred by charging the battery system during the one or more available charging periods, wherein a state of charge of the battery system at the departure time satisfies the target state of charge.

5. The method of claim 2, wherein the available state zone includes an upper bound and a lower bound.

6. The method of claim 1, wherein the mobile client device includes a vehicle.

7. The method of claim 1, further comprising:

receiving power rate data;

determining one or more discharging time slots in the one or more demand response event periods based on the power rate data and the one or more amounts of power to be discharged; and discharging the battery system using the one or more discharging time slots.

8. A computer program product comprising a non-transitory computer-usable medium including a computer-readable program, wherein the computer-readable program when executed on a computer causes the computer to:

estimate a departure time for a mobile client device associated with a user based on historical journey data associated with the user, wherein the mobile client device is associated with a home;

determine a target state of charge at the departure time for a battery system included in the mobile client device;

determine one or more available charging periods and one or more demand response event periods based on demand response event data describing one or more demand response events associated with the one or more demand response event periods during which the mobile client device and the home are requested to reduce power consumption so that neither the mobile client device nor the home receive power from a power grid during the one or more demand response event periods;

determine one or more amounts of power to be discharged from the battery system included in the mobile client device to the home during the one or more demand response event periods so that the home has access to power during the one or more demand response event periods;

determine one or more charging time slots within the one or more available charging periods based on the target state of charge at the departure time and the one or more amounts of power to be discharged from the battery system included in the mobile client device to the home during the one or more demand response event periods;

charge the battery system included in the mobile client device during the one or more charging time slots; and discharge, by the battery system of the mobile client device, power to the home during the one or more demand response event periods so that the home has access to power during the one or more demand response event periods without receiving power from the power grid.

9. The computer program product of claim 8, wherein determining the one or more charging time slots comprises:

receiving power rate data;

determining a current state of charge of the battery system;

determining one or more event start times and one or more event end times associated with the one or more demand response event periods;

determining an available state zone based on the current state of charge, the target state of charge, and the one or more amounts of power to be discharged during the one or more demand response event periods;

determining a sequence of states satisfying the available state zone, the sequence of states including one or more start states of charge at the one or more event start times and one or more end states of charge at the one or more event end times for the battery system; and determining the one or more charging time slots based on the power rate data, the current state of charge, the one or more start states of charge at the one or more event start times, the one or more end states of charge at the one or more event end times, and the target state of charge at the departure time.

10. The computer program product of claim 9, wherein the sequence of states maximizes a total gain for the mobile client device.

11. The computer program product of claim 10, wherein:

the total gain is equal to a discharging gain minus a charging cost;

the discharging gain includes a gain obtained from discharging the one or more amounts of power to a power system during the one or more demand response event periods; and the charging cost includes a power cost incurred by charging the battery system during the one or more available charging periods, wherein a state of charge of the battery system at the departure time satisfies the target state of charge.

12. The computer program product of claim 9, wherein the available state zone includes an upper bound and a lower bound.

13. The computer program product of claim 8, wherein the mobile client device includes a vehicle.

14. The computer program product of claim 8, wherein the computer-readable program when executed on the computer causes the computer to also:

receive power rate data;

determine one or more discharging time slots in the one or more demand response event periods based on the power rate data and the one or more amounts of power to be discharged; and discharge the battery system using the one or more discharging time slots.

15. A system comprising:

a processor; and a memory storing instructions that, when executed, cause the system to:

estimate a departure time for a mobile client device associated with a user based on historical journey data associated with the user, wherein the mobile client device is associated with a home;

determine a target state of charge at the departure time for a battery system included in the mobile client device;

determine one or more available charging periods and one or more demand response event periods based on demand response event data describing one or more demand response events associated with the one or more demand response event periods during which the mobile client device and the home is are requested to reduce power consumption so that neither the mobile client device nor the home receive power from a power grid during the one or more demand response event periods;

determine one or more amounts of power to be discharged from the battery system included in the mobile client device to the home during the one or more demand response event periods so that the home has access to power during the one or more demand response event periods;

determine one or more charging time slots within the one or more available charging periods based on the target state of charge at the departure time and the one or more amounts of power to be discharged from the battery system included in the mobile client device to the home during the one or more demand response event periods;

charge the battery system included in the mobile client device during the one or more charging time slots; and discharge, by the battery system of the mobile client device, power to the home during the one or more demand response event periods so that the home has access to power during the one or more demand response event periods without receiving power from the power grid.

16. The system of claim 15, wherein the instructions cause the system to determine the one or more charging time slots by:

receiving power rate data;

determining a current state of charge of the battery system;

determining one or more event start times and one or more event end times associated with the one or more demand response event periods;

determining an available state zone based on the current state of charge, the target state of charge, and the one or more amounts of power to be discharged during the one or more demand response event periods;

determining a sequence of states satisfying the available state zone, the sequence of states including one or more start states of charge at the one or more event start times and one or more end states of charge at the one or more event end times for the battery system; and determining the one or more charging time slots based on the power rate data, the current state of charge, the one or more start states of charge at the one or more event start times, the one or more end states of charge at the one or more event end times, and the target state of charge at the departure time.

17. The system of claim 16, wherein the sequence of states maximizes a total gain for the mobile client device.

18. The system of claim 17, wherein:

the total gain is equal to a discharging gain minus a charging cost;

the discharging gain includes a gain obtained from discharging the one or more amounts of power to a power system during the one or more demand response event periods; and the charging cost includes a power cost incurred by charging the battery system during the one or more available charging periods, wherein a state of charge of the battery system at the departure time satisfies the target state of charge.

19. The system of claim 15, wherein the mobile client device includes a vehicle.

20. The system of claim 15, wherein the instructions cause the system to also:

receive power rate data;

determine one or more discharging time slots in the one or more demand response event periods based on the power rate data and the one or more amounts of power to be discharged; and discharge the battery system using the one or more discharging time slots.

21. The system of claim 15, wherein the departure time is determined based in part on social network data.

22. The system of claim 21, wherein the social network data is associated with a user of the mobile client device and the home.

23. The system of claim 15, further comprising identifying when the mobile client device is coupled to a charge station and wherein the instructions are executed by the processor responsive to identifying that the mobile client device is coupled to the charge station.

24. The system of claim 16, further comprising identifying a charging connection time when the mobile client device is coupled to a charge station, wherein the one or more demand response event periods occur after the charging connection time and the one or more charging time slots are determined based in part on the charging connection time.

* * * * *